(12) United States Patent
Wang et al.

(10) Patent No.: US 12,503,072 B2
(45) Date of Patent: Dec. 23, 2025

(54) OCCUPANT PROTECTION METHOD AND SYSTEM, AND COMPUTER READABLE MEDIUM

(71) Applicant: ZF Automotive Technologies (Shanghai) Co., Ltd, Shanghai (CN)

(72) Inventors: Hai Wang, Shanghai (CN); Hui Yang, Shanghai (CN); Taotao Jiang, Shanghai (CN); Yuanyi Cheng, Shanghai (CN)

(73) Assignee: ZF ASIA PACIFIC AUTOMOTIVE SAFETY SYSTEMS (SHANGHAI) CO., LTD., Shanghai (CN)

( * ) Notice: Subject to any disclaimer, the term of this patent is extended or adjusted under 35 U.S.C. 154(b) by 404 days.

(21) Appl. No.: 18/015,803

(22) PCT Filed: Jul. 13, 2021

(86) PCT No.: PCT/CN2021/105904
§ 371 (c)(1),
(2) Date: Jan. 12, 2023

(87) PCT Pub. No.: WO2022/012494
PCT Pub. Date: Jan. 20, 2022

(65) Prior Publication Data
US 2023/0271584 A1     Aug. 31, 2023

(30) Foreign Application Priority Data
Jul. 15, 2020   (CN) .......................... 202010680200.1

(51) Int. Cl.
*B60R 21/0134*     (2006.01)
*B60N 2/00*     (2006.01)
(Continued)

(52) U.S. Cl.
CPC .......... *B60R 21/0134* (2013.01); *B60N 2/002* (2013.01); *B60N 2/42718* (2013.01);
(Continued)

(58) Field of Classification Search
CPC .......... B60R 21/0134; B60R 21/01516; B60R 21/01538; B60R 21/0136; B60R 2021/01245; B60N 2/002; B60N 2/42718
See application file for complete search history.

(56) References Cited

U.S. PATENT DOCUMENTS

| | | | |
|---|---|---|---|
| 7,887,089 B2 * | 2/2011 | Breed | ............... B60R 21/01542 701/45 |
| 2005/0206142 A1 | 9/2005 | Prakah-Asante et al. | |

(Continued)

FOREIGN PATENT DOCUMENTS

| | | |
|---|---|---|
| CN | 105640154 A | 6/2016 |
| CN | 110316032 A | 10/2019 |

(Continued)

OTHER PUBLICATIONS

PCT International Search Report for corresponding International Application Serial No. PCT/CN2021/105904, mailed Aug. 27, 2021, pp. 1-6.

*Primary Examiner* — Gertrude Arthur Jeanglaude
(74) *Attorney, Agent, or Firm* — Tarolli, Sundheim, Covell & Tummino LLP

(57) ABSTRACT

An occupant protection method and system, and a computer-readable medium, where the method includes: S1: collecting external environment information of a vehicle; S2: determining, based on the environment information, whether there is an obstacle within a monitoring area, and if yes, proceeding to step S3; or if no, returning to step S1; S3: predicting a movement trajectory of the obstacle; S4: calculating a probability of collision between the vehicle and the obstacle based on vehicle body data and motion information of the vehicle, and the movement trajectory of the obstacle; S5: determining whether the probability of collision is greater than a collision threshold, and if yes, proceeding to step S6; or if no, returning to step S1; S6: partially (Continued)

inflating a seat cushion airbag of the vehicle to adjust a sitting posture of an occupant; S7: determining whether a collision is detected, and if yes, proceeding to step S8; or if no, returning to step S1; and S8: fully inflating the seat cushion airbag.

28 Claims, 6 Drawing Sheets

(51) Int. Cl.
*B60N 2/427* (2006.01)
*B60R 21/0136* (2006.01)
*B60R 21/015* (2006.01)
*B60R 21/01* (2006.01)

(52) U.S. Cl.
CPC .... *B60R 21/0136* (2013.01); *B60R 21/01516* (2014.10); *B60R 21/01538* (2014.10); *B60R 2021/01245* (2013.01)

(56) References Cited

U.S. PATENT DOCUMENTS

| | | |
|---|---|---|
| 2007/0200323 A1 | 8/2007 | Bertele et al. |
| 2014/0265275 A1* | 9/2014 | Rickenbach .......... B60R 21/233 280/739 |
| 2019/0241139 A1* | 8/2019 | Kanegae ................. B60R 22/48 |
| 2019/0299902 A1* | 10/2019 | Nagasawa ........... B60R 21/0132 |

FOREIGN PATENT DOCUMENTS

| | | |
|---|---|---|
| CN | 212556151 U | 2/2021 |
| CN | 212828015 U | 3/2021 |
| JP | 2007071664 A | 3/2007 |

* cited by examiner

OCCUPANT PROTECTION METHOD AND SYSTEM, AND COMPUTER READABLE MEDIUM

RELATED APPLICATIONS

This application is a U.S. National Stage Application filed under 35 USC 371 claiming priority to Serial No. PCT/CN2021/105904, filed on 13 Jul. 2021; which claims priority from Chinese Patent Application CN 202010680200.1, filed 15 Jul. 2020, the entireties of which are hereby incorporated herein by reference.

TECHNICAL FIELD

The present invention relates to a vehicle protection method and system, and a storage medium, and in particular, to an occupant protection method and system equipped with a seat cushion airbag and a computer-readable medium.

BACKGROUND ART

With the development of the automobile industry, automated driving or autonomous driving has become the mainstream research direction in the future. With the continuous advancement of automated driving, seat positions of an occupant will present more possibilities. Safety during driving has always been the most important. During automated driving or autonomous driving, the occupant's attention may not be on the vehicle control or the road environment, so when there is a safety hazard, it may be difficult for the occupant to react in the first time. Therefore, an occupant protection system is generally provided for automated driving or autonomous driving to ensure the safety of the occupant at critical moments.

There are some occupant protection systems, such as airbags and actively retractable safety belts. However, most airbags are activated by gunpowder, which can only be used once, easily causing safety problems. Further, this type of airbag is often activated only when a collision has occurred, and cannot provide an early warning effect. In addition, the existing occupant protection system basically only has a fixed mode, and because different occupants have different sizes, it is difficult for such an occupant protection system to provide targeted safety guarantee.

SUMMARY OF THE INVENTION

To resolve the defects in the prior art that most occupant protection systems using airbags with gunpowder have potential safety hazards and are difficult to provide targeted safety protection for occupants of different sizes, the present invention provides an occupant protection method and system that utilize an inflatable airbag or gas bag to ensure occupant safety and provide targeted safety strategies for different occupants and a computer-readable medium.

The object of the present invention is realized by the following technical solutions:

An occupant protection method, including the following steps:
S1: collecting external environment information of a vehicle by using a radar and a camera;
S2: determining, based on the environment information, whether there is an obstacle within a monitoring area of the vehicle, and if yes, proceeding to step S3; or if no, returning to step S1; and
S3: predicting a movement trajectory of the obstacle;
S4: calculating a probability of collision between the vehicle and the obstacle based on vehicle body data of the vehicle, motion information of the vehicle, and the movement trajectory of the obstacle;
S5: determining whether the probability of collision is greater than a collision threshold, and if yes, proceeding to step S6; or if no, returning to step S1;
S6: partially inflating and deflating a seat cushion airbag of the vehicle to adjust a sitting posture of an occupant;
S7: determining whether a collision is detected, and if yes, proceeding to step S8; or if no, returning to step S1; and
S8: fully inflating the seat cushion airbag to prevent the occupant from submarining, to prevent the occupant from injuries caused by submarining during the collision.

In the technical solution, early warning before the collision is implemented by monitoring the surrounding environment, the inflatable seat cushion airbag is inflated to adjust a sitting posture of the occupant and provide warning for the collision, and the seat cushion airbag is fully inflated when the collision occurs, to prevent the occupant from submarining, and avoid causing injuries to the occupant when the occupant submarines under the seat. In addition, the sitting posture is adjusted properly before the collision, so that even if the obstacle cannot be avoided and the collision occurs, other airbags or safety devices disposed in the vehicle can also protect the occupant.

Preferably, step S1 further includes: collecting road information through the Internet of vehicles; and
step S2 further includes: determining, based on the environment information and the road information, whether there is the obstacle within the monitoring area of the vehicle.

Preferably, step S1 further includes: detecting a reference weight and a reference sitting position of the occupant, and configuring a partial inflation condition and a full inflation condition based on the reference weight and the reference sitting position of the occupant. Detecting the reference weight and the size of the occupant is beneficial to setting a safety strategy suitable for the occupant and implement targeted protection for the occupant.

Preferably, the step of detecting a weight of the occupant includes:
S101: inflating the seat cushion airbag with a gas of a first predetermined volume, and measuring a reference pressure formed by the gas of the first predetermined volume when no occupant is seated;
S102: measuring a first pressure formed by the gas of the first predetermined volume when it is detected that an occupant is seated;
S103: obtaining a first weight based on a difference between the reference pressure and the first pressure, and using the first weight as the reference weight of the occupant.

Preferably, step S102 further includes: obtaining a size of the occupant and obtaining a second weight based on the size when it is detected that an occupant is seated; and
after step S103, the method further includes:
S104: calculating a weighted weight based on a first weighting value allocated to the first weight and a second weighting value allocated to the second weight, and using the weighted weight as the reference weight of the occupant.

Preferably, the size of the occupant is obtained by obtaining joint point information and/or contour information and/or depth information of the occupant by using the camera and/or the radar in step S102.

Preferably, the step of detecting a sitting position of the occupant includes:

S111: inflating the seat cushion airbag with a gas of a second predetermined volume, and measuring reference pressures formed by the gas of the second predetermined volume at various positions of the seat cushion airbag when no occupant is seated;

S112: measuring second pressures formed by the gas of the second predetermined volume at the various positions of the seat cushion airbag when it is detected that an occupant is seated; and S113: inferring a first sitting position based on a difference between the reference pressure and the second pressure that are at each position of the seat cushion airbag, and using the first sitting position as the reference sitting position of the occupant.

In another preferred embodiment of the present invention, step S112 further includes: obtaining a second sitting position of the occupant in the vehicle by using an occupant observation module when it is detected that an occupant is seated; and after step S113, the method further includes:

S114: calculating a weighted position based on a third weighting value allocated to the first sitting position and a fourth weighting value allocated to the second sitting position, and using the weighted position as the reference sitting position of the occupant.

The first predetermined volume may be the same as or different from the second predetermined volume.

Preferably, step S112 includes: obtaining the second sitting position by obtaining depth information of the occupant by using a time-of-flight (ToF) camera (the ToF technology is an imaging technology in which a group of infrared light (laser pulse) that is invisible to the human eyes is emitted outward, reflected after encountering an object, and ends when being reflected to the camera, a time difference or a phase difference between the time at which the light is emitted and the time at which the light is reflected to the camera is calculated, and data is collected to form a set of distance depth data, so as to obtain a stereoscopic 3D model).

Preferably, detection of the sitting position is repeatedly performed at a predetermined time interval in step S1.

Preferably, the motion information includes a velocity, an acceleration, steering information, and information from electronic power steering (ESP), an antilock brake system (ABS), an electronic stability program (ESP), and an autonomous emergency braking (AEB) system; and/or the environment information includes information from an advanced driving assistance system (ADAS) of the vehicle.

Preferably, step S3 includes:

S31: collecting obstacle information of the obstacle by using the camera and the radar, where the obstacle information includes an obstacle type, a current position of the obstacle, a velocity of the obstacle, and a moving direction of the obstacle; and S32: predicting the movement trajectory of the obstacle based on the obstacle information.

Preferably, after step S32, the method further includes:

S33: calculating an occurrence probability of each movement trajectory based on the obstacle information, where a plurality of movement trajectories may be a plurality of possible movement trajectories of one obstacle, or movement trajectories of a plurality of obstacles, or a combination of thereof;

calculating the probability of collision between the vehicle and the obstacle based on the vehicle body data of the vehicle, the motion information of the vehicle, the movement trajectory of the obstacle, and the occurrence probability of each movement trajectory (that is, a probability that the obstacle moves along the movement trajectory) in step S4, where the probability of collision may be a probability of collision between the vehicle and one obstacle or probabilities of collision between the vehicle and a plurality of obstacles.

The present invention further provides an occupant protection system, including an information collection module, a determining module, a calculation module, and a control module, where the information collection module includes a radar, a camera, and a vehicle sensor unit, where the radar and the camera are configured to collect external environment information of the vehicle, and the vehicle sensor unit is configured to collect motion information of the vehicle;

the determining module is configured to: determine, based on the environment information, whether there is an obstacle within a monitoring area of the vehicle, determine whether a probability of collision is greater than a collision threshold, and determine whether a collision occurs;

the calculation module is configured to predict a movement trajectory of the obstacle, and calculate the probability of collision between the vehicle and the obstacle based on vehicle body data of the vehicle, the motion information of the vehicle, and the movement trajectory of the obstacle; and the control module is configured to: when the probability of collision is greater than the collision threshold, partially inflate a seat cushion airbag of the vehicle to adjust a sitting posture of an occupant, and when a collision is detected, fully inflate the seat cushion airbag to prevent the occupant from submarining.

Preferably, the information collection module is further configured to collect road information through the Internet of vehicles; and the determining module is further configured to determine, based on the environment information and the road information, whether there is the obstacle within the monitoring area of the vehicle.

Preferably, the occupant protection system further includes a detection module configured to detect a reference weight and a reference sitting position of the occupant; and the control module is further configured to configure a partial inflation condition and a full inflation condition based on the reference weight and the reference sitting position of the occupant.

Preferably, the occupant protection system further includes an inflation module configured to inflate the seat cushion airbag;

the control module is configured to control the inflation module to inflate the seat cushion airbag with a gas of a first predetermined volume;

the detection module is configured to measure a reference pressure formed by the gas of the first predetermined volume when no occupant is seated, and measure a first pressure formed by the gas of the first predetermined volume when it is detected that an occupant is seated; and the calculation module is configured to obtain a first weight based on a difference between the reference pressure and the first pressure, and use the first weight as the reference weight of the occupant.

Preferably, the occupant protection system further includes an occupant observation module configured to obtain a size of the occupant and obtain a second weight based on the size, and the occupant protection system further includes an inflation module configured to inflate the seat cushion airbag;
  the control module is configured to control the inflation module to inflate the seat cushion airbag with a gas of a predetermined volume;
  the detection module is configured to measure a reference pressure formed by the gas of the predetermined volume when no occupant is seated, and measure a first pressure formed by the gas of the predetermined volume when it is detected that an occupant is seated; and
  the calculation module is further configured to: obtain a first weight based on a difference between the reference pressure and the first pressure, calculate a weighted weight based on a first weighting value allocated to the first weight and a second weighting value allocated to the second weight, and use the weighted weight as the reference weight of the occupant.

Preferably, the occupant observation module includes a camera and/or a radar disposed in the vehicle that are configured to obtain the size of the occupant by obtaining joint point information and/or contour information and/or depth information of the occupant.

Preferably, the occupant protection system further includes an inflation module configured to inflate the seat cushion airbag;
  the control module is configured to control the inflation module to inflate the seat cushion airbag with a gas of a second predetermined volume;
  the detection module is configured to measure reference pressures formed by the gas of the second predetermined volume at various positions of the seat cushion airbag when no occupant is seated, and measure second pressures formed by the gas of the second predetermined volume at the various positions of the seat cushion airbag when it is detected that an occupant is seated; and
  the calculation module is configured to infer a first sitting position based on a difference between the reference pressure and the second pressure that are at each position of the seat cushion airbag, and use the first sitting position as the reference sitting position of the occupant.

Preferably, the occupant protection system further includes an occupant observation module configured to obtain a second sitting position of the occupant in the vehicle, and the occupant protection system further includes an inflation module configured to inflate the seat cushion airbag;
  the control module is configured to control the inflation module to inflate the seat cushion airbag with a gas of a predetermined volume;
  the detection module is configured to measure reference pressures formed by the gas of the predetermined volume at various positions of the seat cushion airbag when no occupant is seated, and measure second pressures formed by the gas of the predetermined volume at the various positions of the seat cushion airbag when it is detected that an occupant is seated; and
  the calculation module is further configured to: infer a first sitting position based on a difference between the reference pressure and the second pressure that are at each position of the seat cushion airbag, calculate a weighted position based on a third weighting value allocated to the first sitting position and a fourth weighting value allocated to the second sitting position, and use the weighted position as the reference sitting position of the occupant.

The first predetermined volume may be the same as or different from the second predetermined volume.

Preferably, the occupant observation module includes a ToF camera configured to obtain the second sitting position by obtaining depth information of the occupant.

Preferably, the seat cushion airbag includes a plurality of gas bags;
  the inflation module is configured to inflate each gas bag with an initial gas;
  the detection module is configured to measure a reference pressure formed by the initial gas in each gas bag when no occupant is seated, and measure an actual pressure formed by the initial gas in each gas bag when it is detected that an occupant is seated; and
  the calculation module is configured to obtain position distribution based on a difference between the reference pressure in each gas bag and the actual pressure in the gas bag, and defining the sitting position of the occupant based on the position distribution.

Preferably, volumes of initial gases in at least some gas bags are the same.

Preferably, the motion information includes a velocity, an acceleration, steering information, and information from ESP, an ABS, an ESP, and AEB; and/or
  the environment information includes information from an ADAS of the vehicle.

Preferably, the information collection module is further configured to collect obstacle information of the obstacle by using the camera and the radar that are disposed on a vehicle body, where the obstacle information includes an obstacle type, a current position of the obstacle, a velocity of the obstacle, and a moving direction of the obstacle; and
  the calculation module is further configured to predict the movement trajectory of the obstacle based on the obstacle information.

Preferably, the calculation module is further configured to calculate an occurrence probability of each movement trajectory based on the obstacle information, and is configured to calculate a probability of collision between the vehicle and the obstacle based on the vehicle body data of the vehicle, the motion information of the vehicle, the movement trajectory of the obstacle, and the occurrence probability of each movement trajectory.

The present invention further provides a computer-readable medium, where the computer-readable medium stores computer instructions that, when executed by a processor, implement the steps of the occupant protection method of any one of the above.

The technical effects obtained by the present invention are as follows:

1. Through the monitoring of the surrounding environment of the vehicle, after an obstacle is discovered, whether a collision may occur is predicted based on conditions of the vehicle, and in the case of a high probability of collision, corresponding airbags are partially inflated in time to adjust the sitting posture of the occupant, so as to ensure the safety of the occupant.

2. Through the technical solution of the present invention, if the occupant can respond in time, it is possible to control the vehicle to avoid the collision; or if the occurrence of the collision cannot be avoided, when the collision occurs, the seat cushion airbag is fully inflated to prevent the occupant from submarining, thereby preventing injuries caused by the submarining.

3. For different occupants, double detection of the weight and size is added, the actual situation of the occupant is fully considered and a targeted safety strategy is formulated for the occupant, which further guarantees the safety of the occupant.

DETAILED DESCRIPTION OF EMBODIMENTS

The specific implementations of the present invention will be further described below with reference to the accompanying drawings.

An occupant protection method and system according to an embodiment of the present invention are described with reference to FIG. 1 and FIG. 2. The occupant protection method includes the following steps:

step 101: collecting external environment information of a vehicle by using a radar and a camera;

step 102: determining, based on the environment information, whether there is an obstacle within a monitoring area of the vehicle, and if yes, proceeding to step 103; or if no, returning to step 101;

step 103: predicting a movement trajectory of the obstacle, specifically, collecting obstacle information of the obstacle by using, for example, the camera and the radar that are disposed on a vehicle body, where the obstacle information includes an obstacle type (whether the obstacle is a person or a vehicle), a current position of the obstacle, a velocity of the obstacle, and a moving direction of the obstacle, and the movement trajectory of the obstacle is predicted based on the obstacle information;

step 104: calculating a probability of collision between the vehicle and the obstacle based on vehicle body data of the vehicle, motion information of the vehicle, and the movement trajectory of the obstacle;

step 105: determining whether the probability of collision is greater than a collision threshold, and if yes, proceeding to step 106; or if no, returning to step 101;

step 106: partially inflating a seat cushion airbag of the vehicle to adjust a sitting posture of an occupant;

step 107: determining whether a collision is detected, where for the existing non-automated driving mode, the occupant may be able to intervene in the operation of the vehicle to avoid a collision, and if the collision is not avoided, proceeding to step 108; or if the collision is avoided through manual intervention, returning to step 101; and step 108: fully inflating the seat cushion airbag to prevent the occupant from submarining, to prevent the occupant from injuries caused by submarining during the collision.

In a preferred solution, step 103 further includes: calculating an occurrence probability of each movement trajectory based on the obstacle information, for example, calculating a plurality of possible movement trajectories of each obstacle, and calculating the probability of collision between the vehicle and the obstacle based on the occurrence probability of each movement trajectory in addition to the vehicle body data of the vehicle, the motion information of the vehicle, the movement trajectory of the obstacle in step 104. Alternatively, a plurality of possible movement trajectories of an obstacle closest to the vehicle are calculated, and the movement trajectory with the highest occurrence probability is selected to calculate the probability of collision.

Figure 2:
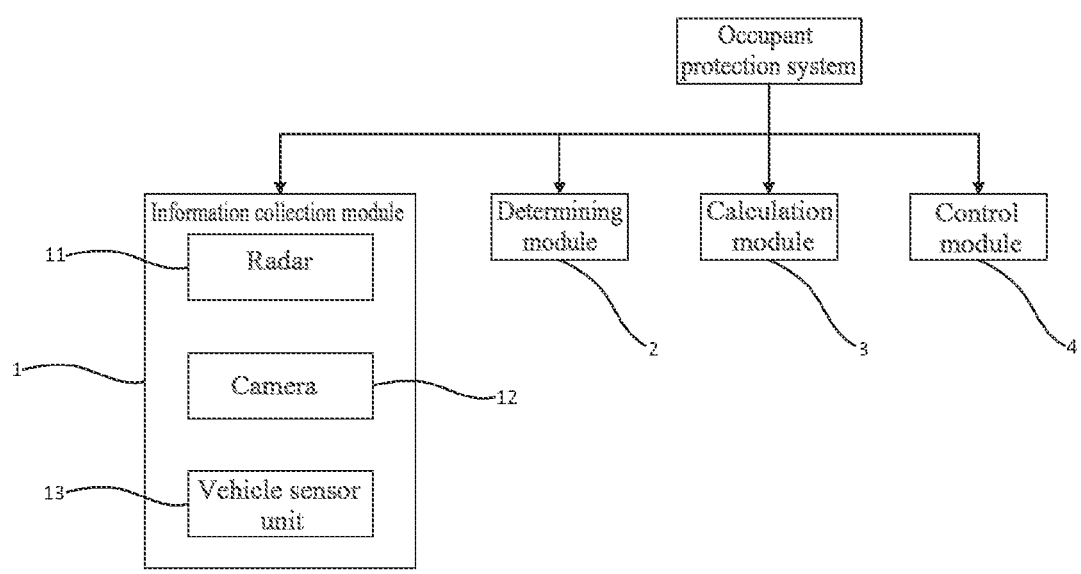
FIG. 2 is a structural block diagram of an occupant protection system according to an embodiment of the present invention.

Referring to FIG. 2, the occupant protection system includes an information collection module 1, a determining module 2, a calculation module 3, and a control module 4.

The information collection module 1 includes a radar 11, a camera 12, and a vehicle sensor unit 13, where the radar 11 and the camera 12 are configured to collect external environment information of the vehicle, and the vehicle sensor unit 13 is configured to collect motion information of the vehicle.

The determining module 2 is configured to: determine, based on the environment information, whether there is an obstacle within a monitoring area of the vehicle, determine whether a probability of collision is greater than a collision threshold, and determine whether a collision occurs.

The calculation module 3 is configured to predict a movement trajectory of the obstacle, and calculate the probability of collision between the vehicle and the obstacle based on vehicle body data of the vehicle, the motion information of the vehicle, and the movement trajectory of the obstacle.

The control module 4 is configured to: when the probability of collision is greater than the collision threshold, partially inflate a seat cushion airbag of the vehicle to adjust a sitting posture of an occupant, and when a collision is detected, fully inflate the seat cushion airbag to prevent the occupant from submarining.

The motion information includes a velocity, an acceleration, steering information, and information from ESP, an ABS, an ESP, and AEB. The environment information includes information from an ADAS of the vehicle.

An occupant protection method and system according to another embodiment of the present invention are described with reference to FIG. 3 to FIG. 6.

Figure 3:
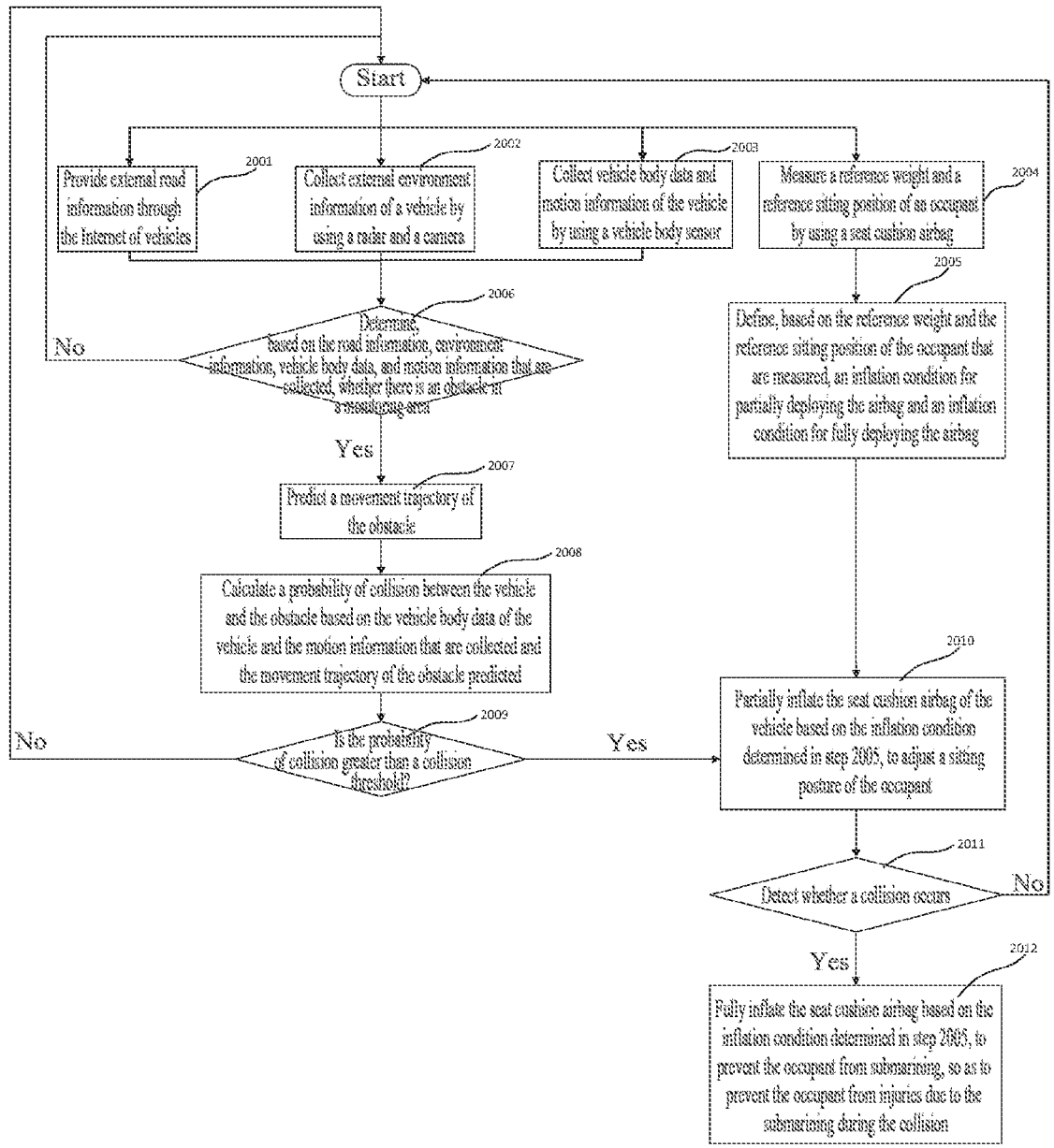
FIG. 3 is a flowchart of an occupant protection method according to another embodiment of the present invention.

Referring to FIG. 3, the occupant protection method includes the following steps.

The process starts with step 2001, and then steps 2002, 2003, and 2004. Those skilled in the art can understand that steps 2001, 2002, 2003, and 2004 can be performed simultaneously or sequentially, and the execution sequence of the steps can be changed arbitrarily without affecting the implementation of the present invention.

In step 2001, external road information is provided through the Internet of vehicles.

In step 2002, external environment information of a vehicle is collected by using a radar and a camera.

In step 2003, vehicle body data and motion information of the vehicle are collected by using a vehicle body sensor.

In step 2004, a reference weight and a reference sitting position of an occupant are measured by using a seat cushion airbag.

In step 2005, an inflation condition for partially deploying the airbag and an inflation condition for fully deploying the airbag are defined based on the reference weight and the reference sitting position of the occupant measured in step 2004.

In step 2006, whether there is an obstacle in a monitoring area is determined based on the road information, environment information, vehicle body data, and motion information that are collected in steps 2001 to 2003, and if yes, step 2007 is performed; or if no, the start step is performed.

In step 2007, a movement trajectory of the obstacle is predicted.

In step 2008, a probability of collision between the vehicle and the obstacle is calculated based on the vehicle body data and motion information of the vehicle that are collected and the movement trajectory of the obstacle predicted in step 2007.

In step 2009, whether the probability of collision calculated in step 2008 is greater than a collision threshold is determined; and if yes, step 2010 is performed; or if no, the start step is performed.

In step 2010, when the probability of collision is greater than the collision threshold, the seat cushion airbag of the vehicle is partially inflated, based on the inflation condition determined in step 2005, to adjust a sitting posture of the occupant.

In step 2011, whether a collision occurs is detected; and if yes, step 2012 is performed; or if no, the start step is performed.

In step 2012, the seat cushion airbag is fully inflated based on the inflation condition determined in step 2005, to prevent the occupant from submarining, so as to prevent the occupant from injuries due to the submarining during the collision.

Figure 4:
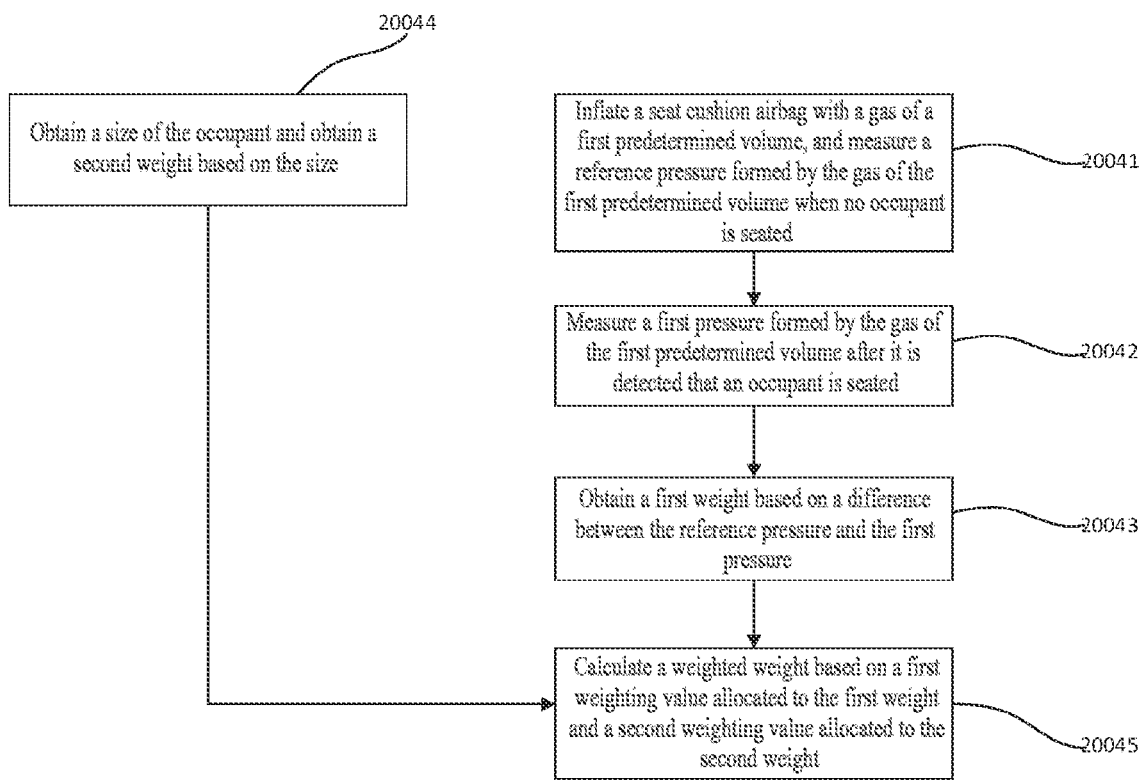
FIG. 4 is a flowchart of detecting a reference weight of an occupant in an occupant protection method according to another embodiment of the present invention.

The reference weight of the occupant in step 2004 is determined using the following method. Referring to FIG. 4:

In step 20041, the seat cushion airbag is inflated with a gas of a first predetermined volume, and a reference pressure formed by the gas of the first predetermined volume when no occupant is seated is measured.

In step 20042, a first pressure formed by the gas of the first predetermined volume after an occupant is seated is measured.

In step 20043, a first weight is obtained based on a difference between the reference pressure and the first pressure.

In step 20044, optionally, a size of the occupant is obtained and a second weight is obtained based on the size, for example, the size of the occupant is obtained by obtaining joint point information and/or contour information of the occupant by using the camera and/or the radar disposed in the vehicle, for example, a sitting height may be obtained by obtaining a distance between a pelvic joint point and the top of the head of the occupant, to generally determine the size of the occupant. Alternatively, depth information of the person may be obtained by using a ToF camera, so that a distance between the person and the ToF camera may be measured, and the size of the occupant may be obtained based on the distance and the joint point information.

In step 20045, optionally, a weighted weight is calculated based on a first weighting value allocated to the first weight and a second weighting value allocated to the second weight.

In some embodiments of the present invention, the first weight may be used as the reference weight of the occupant, while in some other embodiments, the weighted weight may be used as the reference weight of the occupant.

Figure 5:
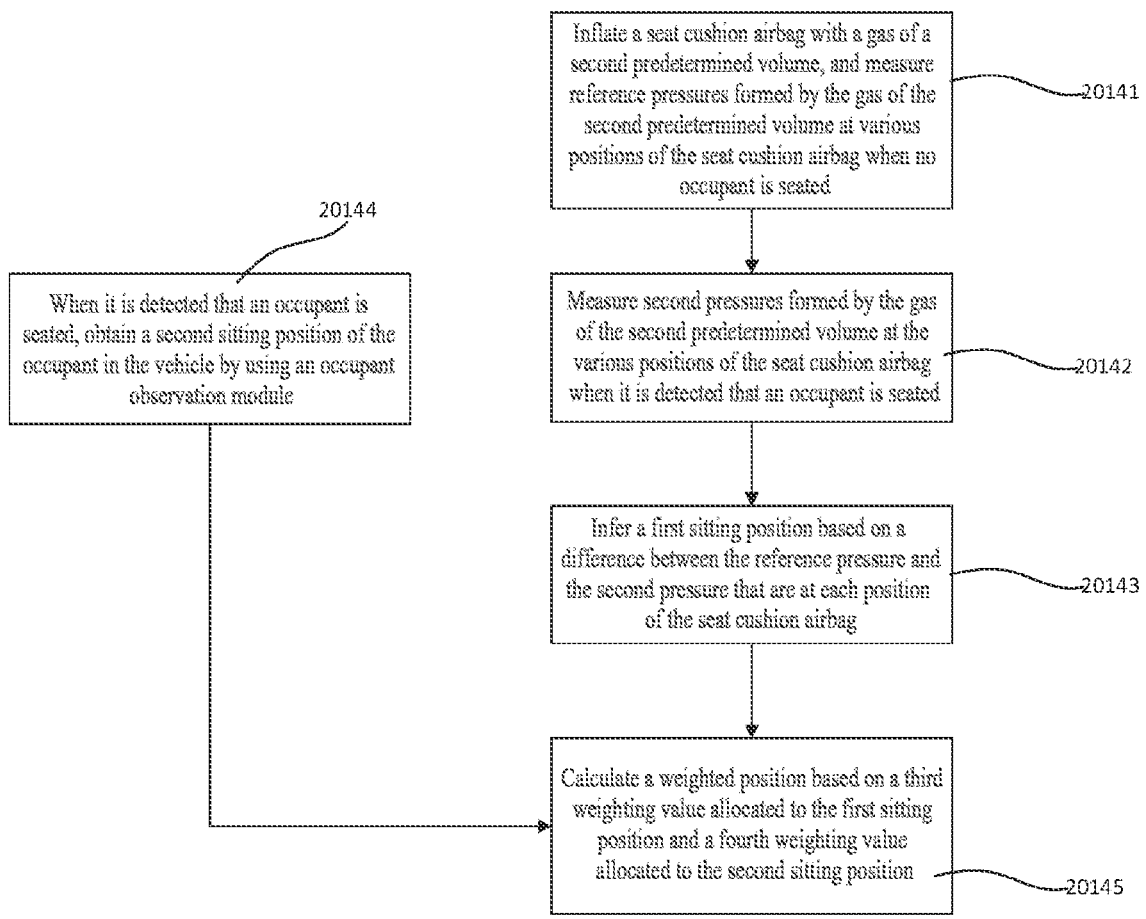
FIG. 5 is a flowchart of detecting a sitting position of an occupant in an occupant protection method according to another embodiment of the present invention.

In addition, referring to FIG. 5, the method of detecting a sitting position of the occupant includes the following steps.

In step 20141, a seat cushion airbag is inflated with a gas of a second predetermined volume, and reference pressures formed by the gas of the second predetermined volume at various positions of the seat cushion airbag when no occupant is seated are measured, for example, a plurality of airbags are placed at different positions in a seat cushion, and therefore, pressures at the positions obtained when a person is seated on the seat cushion are different. The reference pressure is measured first at the initial moment. Then, the position of the person is determined based on different pressure distributions. For example, the position with a relatively high pressure is the position toward which the person slides. Those skilled in the art can understand that the first predetermined volume and the second predetermined volume may be the same or different without affecting the implementation of the present invention.

In step 20142, second pressures formed by the gas of the second predetermined volume at the various positions of the seat cushion airbag when an occupant is seated are measured.

In step 20143, a first sitting position is inferred based on a difference between the reference pressure and the second pressure that are at each position of the seat cushion airbag.

In step 20144, optionally, a second sitting position of the occupant in the vehicle is obtained by using an occupant observation module, for example, depth information of the occupant is obtained by using a ToF camera, to obtain the second sitting position.

In step 20145, optionally, a weighted position is calculated based on a third weighting value allocated to the first sitting position and a fourth weighting value allocated to the second sitting position.

In some embodiments of the present invention, the first sitting position may be used as the reference sitting position of the occupant, while in some other embodiments, the weighted position may be used as the reference sitting position of the occupant.

In the technical solution, the seat cushion airbag is utilized to accurately obtain the reference weight and reference sitting position of the occupant, so as to set an inflation condition for each occupant in a targeted manner, thereby providing targeted protection for the occupant.

Figure 1:
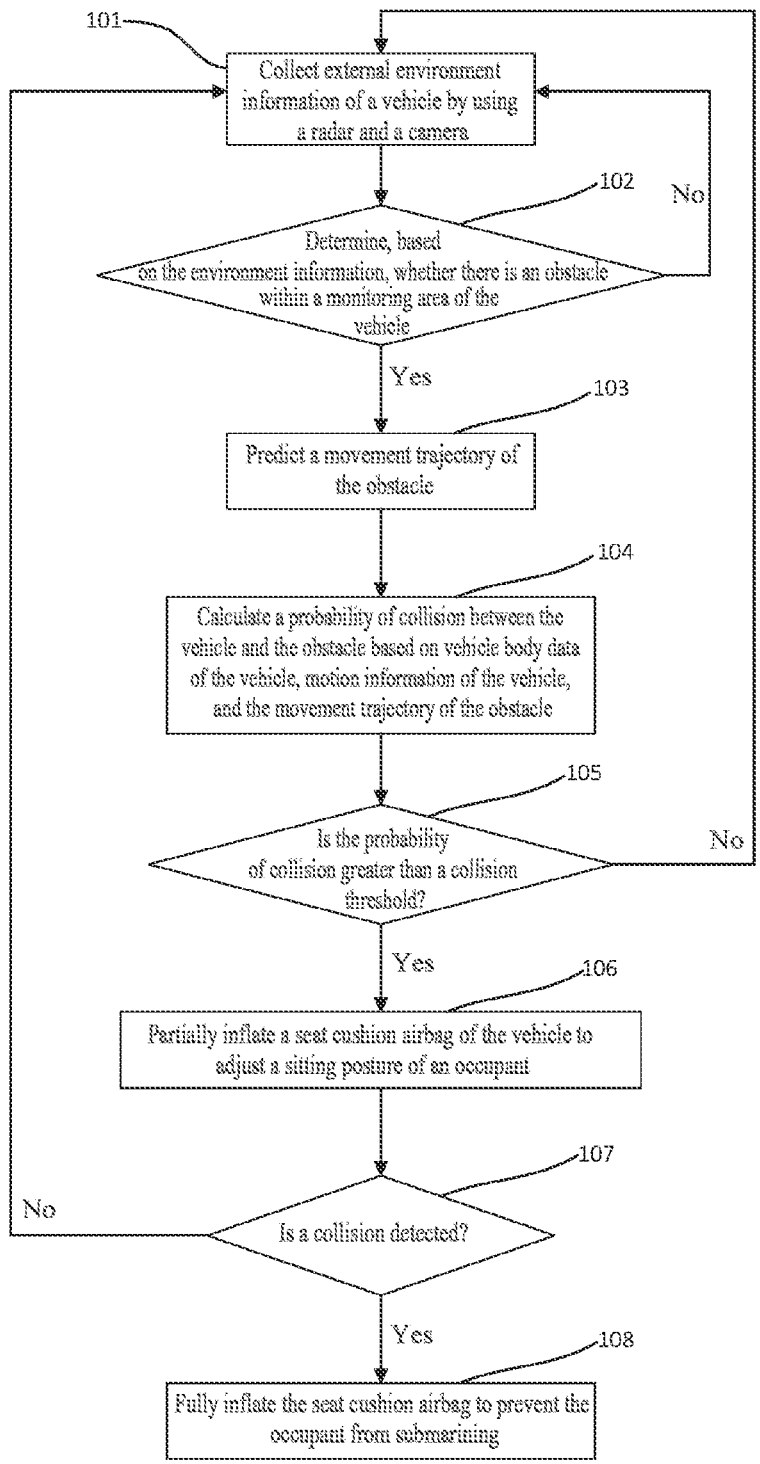
FIG. 1 is a flowchart of an occupant protection method according to an embodiment of the present invention.
Figure 6:
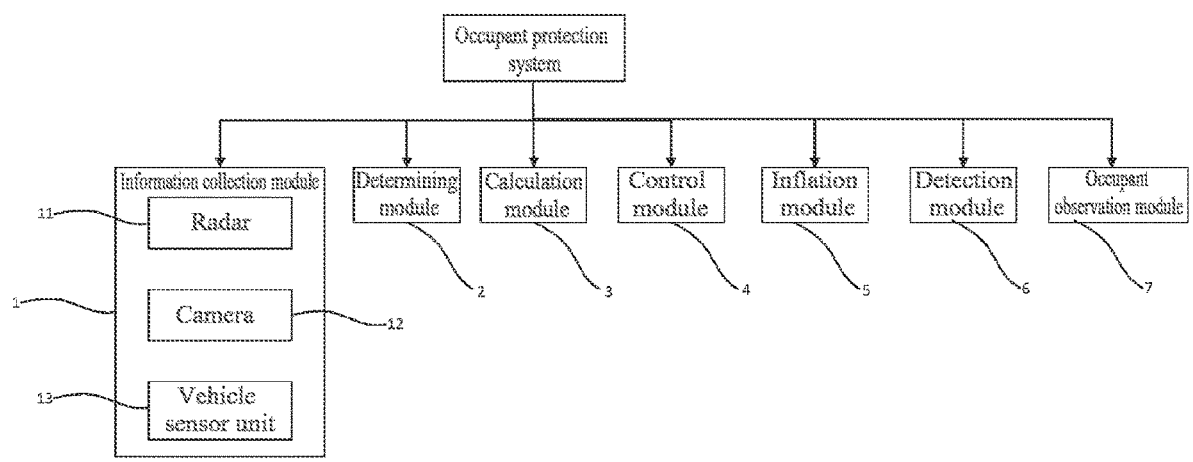
FIG. 6 is a structural block diagram of an occupant protection system according to still another embodiment of the present invention.

Referring to FIG. 6, the occupant protection system in the embodiment is generally the same as the occupant protection system illustrated in FIG. 1, and a difference between the systems lies in that:

the occupant protection system further includes an inflation module 5 configured to inflate the seat cushion airbag and a detection module 6. The control module 4 is configured to control the inflation module 5 to inflate the seat cushion airbag with a gas of a predetermined volume. The detection module 6 is configured to measure a reference pressure formed by the gas of the predetermined volume, for example, a reference pressure formed by the gas of the predetermined volume when no occupant is seated, and a pressure (that is, the first pressure and the second pressure) formed by the gas of the predetermined volume when an occupant is seated. The calculation module 3 is configured to obtain the first weight/the first sitting position based on a difference between the reference pressure and the first pressure/the second pressure.

In addition, the control module 4 is further configured to define a partial inflation condition and a full inflation condition.

To obtain the reference weight of the occupant more accurately, the occupant protection system further includes an occupant observation module 7. The occupant observation module 7 may be configured to obtain a size of the occupant and obtain a second weight based on the size. The calculation module 3 is further configured to calculate a weighted weight based on a first weighting value allocated to the first weight and a second weighting value allocated to the second weight. In addition, the occupant observation module 7 may be further configured to obtain a second sitting position of the occupant in the vehicle. The calculation module 3 may be further configured to calculate a weighted position based on a third weighting value allocated to the first sitting position and a fourth weighting value allocated to the second sitting position.

The inflation module 5 may be configured to inflate the seat cushion airbag in a plurality of manners. A preferred implementation is as follows: the seat cushion airbag includes a plurality of gas bags; and the inflation module 5 is configured to inflate each gas bag with an initial gas, and therefore, the detection module 6 is configured to measure a reference pressure formed by the initial gas in each gas bag when no occupant is seated, and measure an actual pressure formed by the initial gas in each gas bag when it is detected that an occupant is seated.

Volumes of initial gases in at least some gas bags are the same.

The present invention further provides a computer-readable medium, where the computer-readable medium stores computer instructions that, when executed by a processor, implement the steps of the occupant protection method of any one of the above.

According to the present invention, the inflatable seat cushion airbag is utilized, the surrounding environment of the vehicle is monitored by using the radar, the camera, and the sensor of the vehicle, and when an obstacle is detected and a high probability of collision is determined, the seat cushion airbag is inflated in time to adjust the sitting posture of the occupant, thereby implementing protection for the occupant.

Although the specific embodiments of the present invention are described above, it should be appreciated by those skilled in the art that these are merely illustrative and that the scope of protection of the present invention is defined by the appended claims. Various changes or modifications to these embodiments may be made by those skilled in the art without departing from the principle and spirit of the present invention, and these changes or modifications fall within the scope of the present invention.

What is claimed is:

1. An occupant protection method executed by a processor configured to perform a series of steps, comprising:
   S1: collecting external environment information of a vehicle by using a radar and a camera;
   S2: determining, based on the environment information, whether there is an obstacle within a monitoring area of the vehicle;
   in response to the determination in step S2 that there is an obstacle within a monitoring area of the vehicle, proceeding to step S3;
   in response to the determination in step S2 that there is not an obstacle within a monitoring area of the vehicle, returning to step S1;
   S3: predicting a movement trajectory of the obstacle;
   S4: calculating a probability of collision between the vehicle and the obstacle based on vehicle body data of the vehicle, motion information of the vehicle, and the movement trajectory of the obstacle;
   S5: determining whether the probability of collision is greater than a collision threshold;
   in response to the determination in step S5 that the probability of collision is greater than a collision threshold, proceeding to step S6
   in response to the determination in step S5 that the probability of collision is not greater than a collision threshold, returning to step S1
   S6: partially inflating and deflating a seat cushion airbag of the vehicle to adjust a sitting posture of an occupant;
   S7: determining whether a collision is detected;
   In response to the determination in step S7 that a collision is detected, proceeding to step S8;
   In response to the determination in step S7 that a collision is not detected, returning to step S1;
   S8: fully inflating the seat cushion airbag to prevent the occupant from submarining.

2. The occupant protection method of claim 1, wherein step S1 further comprises: collecting road information through the Internet of vehicles; and
   step S2 further comprises: determining, based on the environment information and the road information, whether there is the obstacle within the monitoring area of the vehicle.

3. The occupant protection method of claim 1, wherein step S1 further comprises: detecting a reference weight and a reference sitting position of the occupant, and configuring a partial inflation condition and a full inflation condition based on the reference weight and the reference sitting position of the occupant.

4. The occupant protection method of claim 3, wherein the step of detecting a weight of the occupant comprises:
   S101: inflating the seat cushion airbag with a gas of a first predetermined volume, and measuring a reference pressure formed by the gas of the first predetermined volume when no occupant is seated;
   S102: measuring a first pressure formed by the gas of the first predetermined volume after an occupant is seated; and
   S103: obtaining a first weight based on a difference between the reference pressure and the first pressure, and using the first weight as the reference weight of the occupant.

5. The occupant protection method of claim 3, wherein the step of detecting a weight of the occupant comprises:
   S101: inflating the seat cushion airbag with a gas of a first predetermined volume, and measuring a reference pressure formed by the gas of the first predetermined volume when no occupant is seated;
   S102: measuring a first pressure formed by the gas of the first predetermined volume after an occupant is seated; and obtaining a size of the occupant and obtaining a second weight based on the size;
   S103: obtaining a first weight based on a difference between the reference pressure and the first pressure; and
   S104: calculating a weighted weight based on a first weighting value allocated to the first weight and a second weighting value allocated to the second weight, and using the weighted weight as the reference weight of the occupant.

6. The occupant protection method of claim 5, wherein the size of the occupant is obtained by obtaining joint point information and/or contour information and/or depth information of the occupant by using the camera and/or the radar in step S102.

7. The occupant protection method of claim 3, wherein the step of detecting a sitting position of the occupant comprises:
S111: inflating the seat cushion airbag with a gas of a second predetermined volume, and measuring reference pressures formed by the gas of the second predetermined volume at various positions of the seat cushion airbag when no occupant is seated;
S112: measuring second pressures formed by the gas of the second predetermined volume at the various positions of the seat cushion airbag when an occupant is seated; and
S113: inferring a first sitting position based on a difference between the reference pressure and the second pressure that are at each position of the seat cushion airbag, and using the first sitting position as the reference sitting position of the occupant.

8. The occupant protection method of claim 3, wherein the step of detecting a sitting position of the occupant comprises:
S111: inflating the seat cushion airbag with a gas of a second predetermined volume, and measuring reference pressures formed by the gas of the second predetermined volume at various positions of the seat cushion airbag when no occupant is seated;
S112: measuring second pressures formed by the gas of the second predetermined volume at the various positions of the seat cushion airbag when an occupant is seated; and obtaining a second sitting position of the occupant in the vehicle by using an occupant observation module;
S113: inferring a first sitting position based on a difference between the reference pressure and the second pressure that are at each position of the seat cushion airbag; and
S114: calculating a weighted position based on a third weighting value allocated to the first sitting position and a fourth weighting value allocated to the second sitting position, and using the weighted position as the reference sitting position of the occupant.

9. The occupant protection method of claim 8, wherein step S112 comprises: obtaining the second sitting position by obtaining depth information of the occupant by using a ToF camera.

10. The occupant protection method of claim 3, wherein detection of the sitting position is repeatedly performed at a predetermined time interval in step S1.

11. The occupant protection method of claim 1, wherein the motion information comprises a velocity, an acceleration, steering information, and information from ESP, an ABS, an ESP, and AEB; and/or the environment information comprises information from an ADAS of the vehicle.

12. The occupant protection method of claim 1, wherein step S3 comprises:
S31: collecting obstacle information of the obstacle by using the camera and the radar, wherein the obstacle information comprises an obstacle type, a current position of the obstacle, a velocity of the obstacle, and a moving direction of the obstacle; and
S32: predicting the movement trajectory of the obstacle based on the obstacle information.

13. The occupant protection method of claim 12, wherein after step S32, the method further comprises:
S33: calculating an occurrence probability of each movement trajectory based on the obstacle information; and
calculating the probability of collision between the vehicle and the obstacle based on the vehicle body data of the vehicle, the motion information of the vehicle, the movement trajectory of the obstacle, and the occurrence probability of each movement trajectory in step S4.

14. A computer-readable medium, wherein the computer-readable medium stores computer instructions that, when executed by a processor, implement steps of the occupant protection method of claim 1.

15. An occupant protection system, comprising a processor comprising an information collection module, a determining module, a calculation module, and a control module, wherein
the information collection module further includes a radar, a camera, and a vehicle sensor unit, wherein the radar and the camera are configured to collect external environment information of the vehicle, and the vehicle sensor unit is configured to collect motion information of the vehicle;
the processor is configured to execute the determining module to: determine, based on the environment information, whether there is an obstacle within a monitoring area of the vehicle, determine whether a probability of collision is greater than a collision threshold, and determine whether a collision occurs;
the processor is configured to execute the calculation module is configured to predict a movement trajectory of the obstacle, and calculate the probability of collision between the vehicle and the obstacle based on vehicle body data of the vehicle, the motion information of the vehicle, and the movement trajectory of the obstacle; and
the processor is configured to execute the control module is configured to: when the probability of collision is greater than the collision threshold, partially inflate a seat cushion airbag of the vehicle to adjust a sitting posture of an occupant, and when a collision is detected, fully inflate the seat cushion airbag to prevent the occupant from submarining.

16. The occupant protection system of claim 15, wherein the information collection module is further configured to collect road information through the Internet of vehicles; and
the determining module is further configured to determine, based on the environment information and the road information, whether there is the obstacle within the monitoring area of the vehicle.

17. The occupant protection system of claim 15, wherein the occupant protection system further comprises a detection module configured to detect a reference weight and a reference sitting position of the occupant; and
the control module is further configured to configure a partial inflation condition and a full inflation condition based on the reference weight and the reference sitting position of the occupant.

18. The occupant protection system of claim 17, wherein the occupant protection system further comprises an inflation module configured to inflate the seat cushion airbag;
the control module is configured to control the inflation module to inflate the seat cushion airbag with a gas of a predetermined volume;
the detection module is configured to measure a reference pressure formed by the gas of the predetermined volume when no occupant is seated, and measure a first pressure formed by the gas of the predetermined volume when it is detected that an occupant is seated; and the calculation module is configured to obtain a first weight based on a difference between the reference pressure and the first pressure, and use the first weight as the reference weight of the occupant.

19. The occupant protection system of claim 17, wherein the occupant protection system further comprises an occupant observation module configured to obtain a size of the occupant and obtain a second weight based on the size, and the occupant protection system further comprises an inflation module configured to inflate the seat cushion airbag;
the control module is configured to control the inflation module to inflate the seat cushion airbag with a gas of a predetermined volume;
the detection module is configured to measure a reference pressure formed by the gas of the predetermined volume when no occupant is seated, and measure a first pressure formed by the gas of the predetermined volume when it is detected that an occupant is seated; and
the calculation module is further configured to obtain a first weight based on a difference between the reference pressure and the first pressure, calculate a weighted weight based on a first weighting value allocated to the first weight and a second weighting value allocated to the second weight, and use the weighted weight as the reference weight of the occupant.

20. The occupant protection system of claim 19, wherein the occupant observation module comprises a camera and/or a radar disposed in the vehicle that are configured to obtain the size of the occupant by obtaining joint point information and/or contour information and/or depth information of the occupant.

21. The occupant protection system of claim 17, wherein the occupant protection system further comprises an inflation module configured to inflate the seat cushion airbag;
the control module is configured to control the inflation module to inflate the seat cushion airbag with a gas of a predetermined volume;
the detection module is configured to measure reference pressures formed by the gas of the predetermined volume at various positions of the seat cushion airbag when no occupant is seated, and measure second pressures formed by the gas of the predetermined volume at the various positions of the seat cushion airbag when it is detected that an occupant is seated; and
the calculation module is configured to infer a first sitting position based on a difference between the reference pressure and the second pressure that are at each position of the seat cushion airbag, and use the first sitting position as the reference sitting position of the occupant.

22. The occupant protection system of claim 17, wherein the occupant protection system further comprises an occupant observation module configured to obtain a second sitting position of the occupant in the vehicle, and the occupant protection system further comprises an inflation module configured to inflate the seat cushion airbag;
the control module is configured to control the inflation module to inflate the seat cushion airbag with a gas of a predetermined volume;
the detection module is configured to measure reference pressures formed by the gas of the predetermined volume at various positions of the seat cushion airbag when no occupant is seated, and measure second pressures formed by the gas of the predetermined volume at the various positions of the seat cushion airbag when it is detected that an occupant is seated; and
the calculation module is further configured to: infer a first sitting position based on a difference between the reference pressure and the second pressure that are at each position of the seat cushion airbag, calculate a weighted position based on a third weighting value allocated to the first sitting position and a fourth weighting value allocated to the second sitting position, and use the weighted position as the reference sitting position of the occupant.

23. The occupant protection system of claim 22, wherein the occupant observation module comprises a ToF camera configured to obtain the second sitting position by obtaining depth information of the occupant.

24. The occupant protection system of claim 17, wherein the occupant protection system further comprises an inflation module configured to inflate the seat cushion airbag, and the seat cushion airbag comprises a plurality of gas bags;
the inflation module is configured to inflate each gas bag with an initial gas;
the detection module is configured to measure a reference pressure formed by the initial gas in each gas bag when no occupant is seated, and measure an actual pressure formed by the initial gas in each gas bag when it is detected that an occupant is seated; and
the calculation module is configured to obtain the reference sitting position of the occupant based on a difference between the reference pressure in each gas bag and the actual pressure in each gas bag.

25. The occupant protection system of claim 24, wherein volumes of initial gases in at least some gas bags are the same.

26. The occupant protection system of claim 15, wherein the motion information comprises a velocity, an acceleration, steering information, and information from ESP, an ABS, an ESP, and AEB; and/or the environment information comprises information from an ADAS of the vehicle.

27. The occupant protection system of claim 15, wherein the information collection module is further configured to collect obstacle information of the obstacle by using the camera and the radar that are disposed on a vehicle body, wherein the obstacle information comprises an obstacle type, a current position of the obstacle, a velocity of the obstacle, and a moving direction of the obstacle; and
the calculation module is further configured to predict the movement trajectory of the obstacle based on the obstacle information.

28. The occupant protection system of claim 27, wherein the calculation module is further configured to calculate an occurrence probability of each movement trajectory based on the obstacle information, and is configured to calculate a probability of collision between the vehicle and the obstacle based on the vehicle body data of the vehicle, the motion information of the vehicle, the movement trajectory of the obstacle, and the occurrence probability of each movement trajectory.

* * * * *